Figure 1:
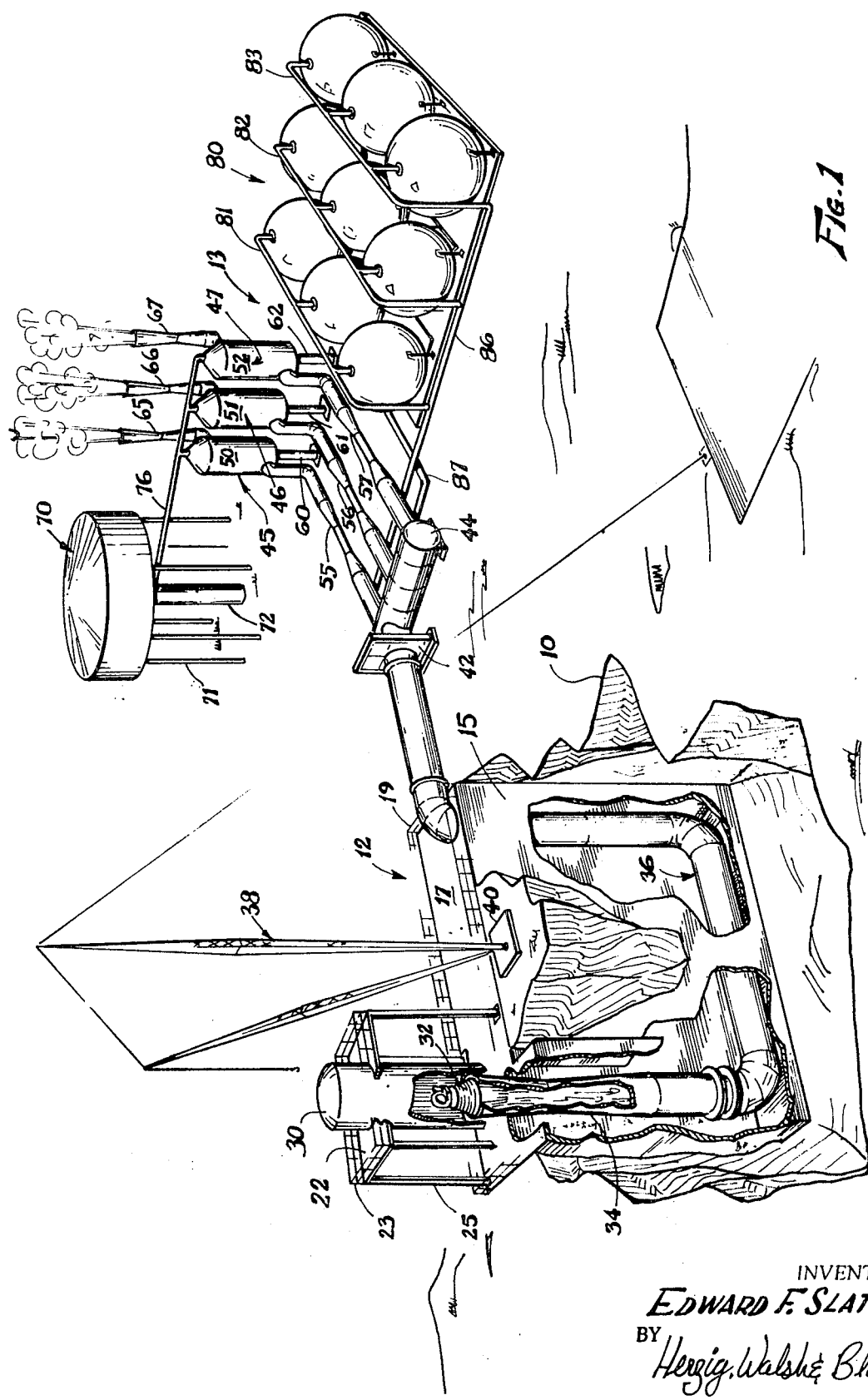

United States Patent

[11] 3,626,907

| [72] | Inventor | Edward F. Slattery |
| | | Los Angeles, Calif. |
| [21] | Appl. No. | 593,388 |
| [22] | Filed | Nov. 10, 1966 |
| [45] | Patented | Dec. 14, 1971 |
| [73] | Assignee | Norman Engineering Co. |
| | | Los Angeles, Calif. |

[54] HIGH-TEMPERATURE HOT-WATER VACUUM SYSTEMS
9 Claims, 2 Drawing Figs.

| [52] | U.S. Cl. | 122/35 |
| [51] | Int. Cl. | F22b 37/22 |
| [50] | Field of Search | 122/35, 32 |

[56] References Cited
UNITED STATES PATENTS

| 2,089,915 | 8/1937 | Gilli | 122/35 |
| 2,280,028 | 4/1942 | Chase et al. | 122/32 |
| 3,076,445 | 2/1963 | Ohlhaver | 122/459 |

OTHER REFERENCES
Gilli, A. P. C. Publication, May 11, 1963, Ser. No. 134,706.

*Primary Examiner*—Charles J. Myhre
*Attorney*—Herzig, Walsh & Blackham

ABSTRACT: The invention is a system for generating steam particularly adapted for providing steam for economical, intermittent vacuum-pumping capability for process systems utilizing steam-driven ejectors. There is no boiler in the system. Water accumulators are provided connected to a shell- and tube-type heat exchanger in which the water is heated under gradually increasing pressure up to a given maximum. The water under substantial pressure in the accumulators is flashed into steam as desired, thru a control valve for use at the steam-driven vacuum ejectors.

INVENTOR.
Edward F. Slattery
BY Herzig, Walsh & Blackham
ATTORNEYS

HIGH-TEMPERATURE HOT-WATER VACUUM SYSTEMS

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to a high temperature hot water vacuum system.

The system is one having a primary purpose of providing economical intermittent vacuum-pumping capability for process systems utilizing steam-driven ejectors for variable periods of, for example, up to 30 minutes during each 8 hours. The steam-driven ejectors may be conventional and do not per se constitute a part of this invention. The vacuum system of the invention may be used with process, or other systems other than the one just mentioned. Some examples of process systems having the type of requirement stated, include high altitude simulation systems for rocket engine testing; vacuum pumping systems for plasma-jet test facilities; altitude start systems for stage rocket engine testing; altitude start and post run purge systems for nuclear rocket testing; vacuum-pumping systems for hypersonic wind tunnels; high-speed evacuation systems for environmental chamber launch transient simulation; vacuum cooling systems for food processing industries; vacuum systems for chemical processes utilizing batch techniques. The invention has a number of objectives and it embodies particular characteristics, as will be made clear hereinafter, for purposes of realizing these objectives and advantages, as will be pointed out.

The invention involves the generation of steam which is accomplished utilizing a particular method and principle of operation by way of a particular system as will be described. Briefly, the steam generator is accomplished by heating water under gradually increasing pressure to, for example, 600 lbs. per square inch in accumulators or storage vessels which may be any conventional geometrical enclosure. A portion of the water is then flashed into steam at a lower pressure by use of a pressure reducing valve. Vacuum pumping is carried out by conventional steam-driven ejectors in either series parallel relationship or in combination with interstage condensing. Each ejector installation is designed for optimum performance considering desired vacuum, equivalent air flow for material being pumped and water availability for interstage condensing.

The water is heated by circulation through one side of a conventional shell and tube heat exchanger. Preferably, hot oil is used at a temperature which may be, for example, 600° F. and atmospheric pressure, the oil being circulated on one side of the heat exchanger, the oil being heated using fuel, such as propane, natural gas, or using an oil-fired heater. Other means may be used for heating the water. However, use of ambient pressure oil heating systems provides a relatively simple system with favorable thermal efficiency and removes the equipment installation from the classification of a steam boiler. This then eliminates the need for licensed stationary engineers for operation. The system does not require a boiler water treatment system other than a conventional water softener and strainer installation. Realization of the advantages inherent in these characteristics are among the objects of the invention.

After each steam generation cycle makeup water is pumped into the storage vessels to replace the weight of steam generated and the water is circulated through the water/oil exchanger until design storage pressure is again reached. The nature of the method and process will be explained in detail hereinafter.

In the light of the foregoing, the objects of the invention will be understood. A primary object is reduction in operating costs. Steam generation operating cost for the system of the invention is less than one-tenth of the operating cost for a LOX propane chemical steam generator system and less than one-twelfth the operating cost for a hydrogen peroxide steam generator system.

Another object is to realize reduced maintenance costs. It has been found that maintenance costs of the system have been very favorable.

Another object is to provide a system as described wherein all components can be proven off-the-shelf equipment.

Another object is to realize the characteristic in the system that it can be energized, tested and held in readiness for indefinite periods of time.

Another object of the invention is to realize the characteristic of simplified shutdown and startup. The system is such that shutdown can be accomplished by closing a single valve, (rate of valve closing not being critical) and startup can be accomplished by reopening the said one valve.

A particular object of the invention is to especially adapt it for use in the testing of rocket engines. It may be desirable to test rocket engines of different mass flows and thrust levels and in this event, the herein invention can be readily adapted to drive ejectors of different flow rates, or either parallel or series combinations of ejectors. Steam flow rates are adjustable from zero to design maximum simply by the flow requirements of the connected load. No modification to system or controls is required. The time run varies inversely with flow rates since the system delivers a fixed total weight of steam from each recharge cycle.

Another object is to realize the characteristic in the system of there being no reverse flow on shutdown. In the system of the invention steam flow diminishes proportionately to valve closure position during shutdown. Steam flow cutoff is gradual and rate of pressure rise from subatmospheric to atmospheric at test chamber is smooth over period selected for valve closure time. There is no sudden cutoff of vacuum with reverse flow.

Another object is to realize the advantage that there is no loss of propellant during storage. Since the fuel used is either natural gas, propane or diesel oil, there is no loss of cryogenic oxidizer. As a result, system fuel can be stored over long periods of time with no losses or special maintenance.

Another object is to reduce hazards to personnel. Since there is an absence of cryogenic material, pressurizing systems, high-pressure gas storage, fill and transfer systems, there is less hazard to personnel from safety blowout devices, or vessel, line, or valve rupture.

Another object is to reduce or eliminate fire hazard or explosion hazard. Because of the absence of high-pressure fuel and cryogenic oxidizer, there is essentially no hazard from explosion or fire. Fuel for the oil heater unit is stored and used at atmospheric pressure. No fire systems or shrapnel shields are necessary for the high-pressure hot water system.

Figure 2:
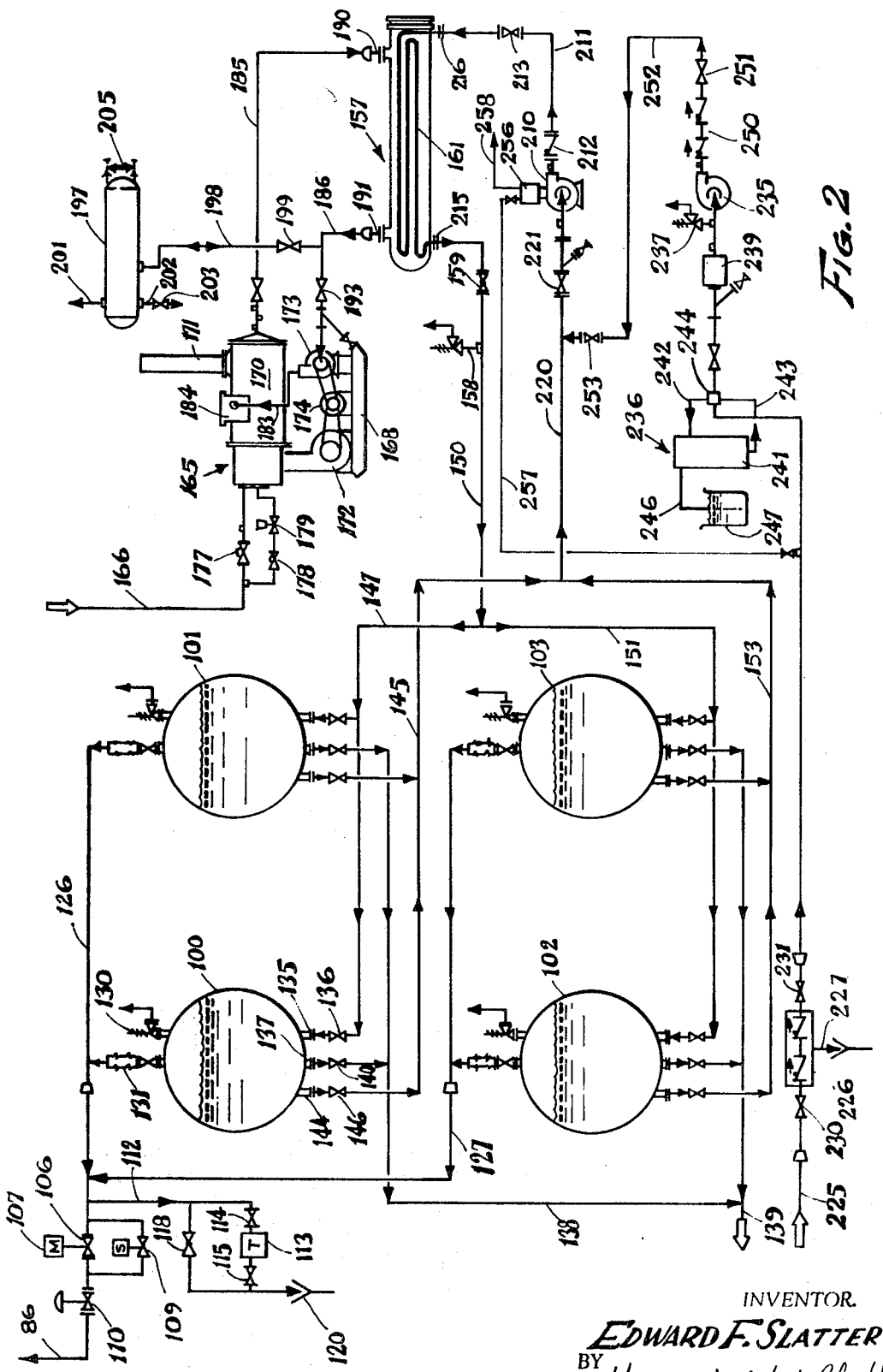

Further objects and additional advantages will become apparent from the following detailed description and annexed drawings wherein:

FIG. 1 is a pictorial view of the system of the invention utilized in connection with the testing of a rocket engine; and FIG. 2 is a diagram of the processing system for generating the steam for the ejector plant of FIG. 1.

Referring now more in detail to FIG. 1 of the drawing, this figure is a pictorial view of a rocket test stand having a diffuser connected to a steam ejector plant provided with steam generated by the system of the invention. This figure shows one exemplary application of the stem-generating system of the invention.

The test facility, as shown in FIG. 1, is partly below ground, the ground level being indicated at 10 in the figure. This figure is pictorial or schematic to illustrate the application of the steam-generating system in this particular environment.

The rocket test facility is indicated generally at 12 and the steam ejector plant is indicated generally at 13. The rocket test stand includes a compartment 15 extending below ground level. The top of this compartment forms a platform as designated at 17 having a railing 19 around it. The platform 17 supports a further secondary test stand platform 22 having a railing 23 around it on uprights as shown at 25. In the center of the secondary platform 22 is a circular chamber 30, the top of which is removable and in the lower part of which the rocket engine to be tested is mounted, the rocket engine being designated at 32. It is mounted to discharge downwardly into a diffuser 34 which is evacuated by the steam ejector plant 13 which produces vacuum. The diffuser ejector may be cooled by a spray cooling system, not shown. The ejector diffuser is connected to the steam ejector plant by steel ducting as designated at 36. The steel ducting comes up through the top of the compartment 15 above ground level as shown.

Numeral 38 designates a conventional crane or derrick which provides a facility for installing and removing the rocket engines with respect to the test facility. The upright of the crane 38 is mounted on a base 40.

The steam ejector plant in the facility shown may be such that the system has a capacity to test solid or liquid rocket engines to 50,000 lbs. thrust for 600 seconds duration at extremely high altitudes simulating operation of rocket engines with large nozzle expansion ratios.

The steam ejector plant may itself be conventional except for the means and method for generating steam. The ducting 36 is supported adjacent the ejector plant by upright valve, then connects to a vacuum header 44. Three of the two-stage steam-operated ejectors are shown as designated generally at 55, 56 and 57. The two-stage steam ejector assembly includes the interstage barometric condensers 60, 51, and 52, which are connected to the header 44 by first-stage ejectors 55, 56, and 57. The condensers 50, 51, and 52 are supported on suitable supports and drained by barometric legs 60, 61, and 62. Steam and ejected vapors are exhausted from the condensers 50, 51, and 52 through the second-stage ejectors 65, 66, and 67.

The steam ejectors are two-stage ejectors with interstage condensing. Water for condensing is supplied from a tank 70 supported on uprights as shown at 71, and having a central stand pipe 72. The water tank has connections to the condensers 50, 51, and 52 for interstage condensing as designated at 76.

The steam-generating plant or system is shown partly in FIG. 1 and in the diagram of FIG. 2. The steam-generating plant comprises a group of water storage accumulators which are shown as spherical. FIG. 1 shows a group of nine such storage accumulators as designated at 80; any number may be used. The accumulators in FIG. 1 are arranged in groups of three connected to the top to manifolds 81, 82, and 83. These manifolds, in turn, connect to a delivery header 86, which delivers steam to the steam ejector plant. The water line for delivering makeup water to the storage accumulators is designated at 87.

FIG. 2 is a diagram of high-pressure complete steam-generating plant. In this figure there are four storage accumulators shown designated at 100, 101, 102, and 103. The water storage accumulators are alike. They are connected in parallel for inflow of makeup water and outflow therefrom. All four connect to the line 86 to the steam ejector plant. In this line is a motorized valve 106 which is operable by motor 107. This valve acts as a system shot off for the high-pressure water vapor from the accumulators. Numeral 109 is a solenoid-operated valve connected in bypass relation to the valve 106 for purposes of bypassing the valve to reduce opening and closing forces. Numeral 110 designates the pressure control valve in the line and beyond the motor-operated valve. This valve acts as a pressure reducing valve to flash vapor at high pressure to steam at a lower pressure. Numeral 112 designates a branch line leading to a steam trap 113 having manual valves 114 and 115 on its inlet and outlet sides. A manual valve 118 is connected in bypass relation to the steam trap 113 which is connected to drain as designated at 120.

Accumulators 100 and 101 are connected to discharge line 126 and accumulators 102 and 103 are connected to discharge line 127. Accumulator 100 has a conventional safety valve as designated at 130 and it connects from its top to line 126 through a coupling 131. The storage accumulator 100 has an inlet connection for makeup water as designated at 135 having a manual valve 136 in it. It has an outlet connection 137 connecting to line 138 which connects to drain line 139, this connection having a manual valve 140 in it. Storage accumulator has water-recirculating connection 144 connecting to recirculating branch line 145 through manual valve 146. Numeral 147 designates the water-circulating line connecting to accumulators 100 and 101 from water line 150. Branch line 151 connects to the accumulators 102 and 103. The recirculating lines of accumulators 102 and 103 connect to branch line 153. The accumulators are alike so that the description of the equipment associated with accumulator 100 applies to the others as well.

The water line 150 connects to an oil/water heat exchanger 157 through a pressure-operated safety valve 158 and a manual valve 159. The oil/water exchanger 157 is a shell-and-tube-type heat exchanger with the water being circulated through the tubing as designated at 161. The oil is heated by a heater as designated at 165 which may be oil or gas fired, for example, in the form of the invention shown, the heater being fired from a source of fuel oil supply through a line 166. The heater has a base 168 which supports the combustion chamber 170 which has a stack 171. Numeral 172 designates a blower for the burner and numeral 173 designates an oil circulating pump, both of which are driven by an electric motor 174.

The fuel oil is supplied through pressure regulator 177 and connected in bypass relationship with this regulator is the manual valve 178 and a valve as designated at 179, which may be an automatic valve.

The oil is circulated by pump 173 through a line 183 to a distributing header filter 184 and through a line 185 to the heat exchanger 157 and through a line 186 back to the heater. Suitable connector fittings are provided as shown at 190 and 191 where the oil lines connect to the heater 157. The manual valve 193 is provided in line 186 connecting to the pump 173.

Numeral 197 designates a compression tank connected to the oil line 186 by a line 198 having manual valve 199 in it. The tank 197 has a vent 201 and a drain line 202 having a manual valve 203 in it. Numeral 205 designates a sight glass on the compression tank. The compression tank 197 accommodates thermal expansion of the oil being circulated.

The water is circulated through the heat exchanger 157 by a motor-driven circulating pump 210 which discharges into a line 211 through a check valve 212 and a manual valve 213. The lines 150 and 211 are connected to the heat exchanger 157 by way of couplings 215 and 216. The pump 210 takes a suction on the line 220 connected to the branch lines 145 and 153 previously described. In this line there is provided a manual valve 221.

Numeral 225 designates a makeup water feed line connected to the site water source. In this line is a back flow preventor 226 of conventional type having a connection 227 to drain and having associated with it manual valves 230 and 231. This line connects to the motor-driven makeup water pump 235 beyond the water softener 236 which may be of conventional type. Ahead of the pump 235 is a pressure responsive safety valve 237 and a totalizing flow meter.

The water softener comprises a tank 241 having inlet and outlet connections 242 and 243, respectively, connected to a fitting 244 in the line to the makeup water pump 235. Numeral 246 designates a line connecting to the regenerating brine tank 247 of the water softener which is conventional.

The makeup water pump 235 discharges through a check valve 250 and manual valve 251 into line 252 which connects through manual valve 253 to the line 220. Numeral 256 designates a heat exchanger for cooling bearings of the water-circulating pump 210. Water is delivered to this heat exchanger, which is conventional, through line 257 from line 225. Line 258 is a drain line.

From the foregoing, those skilled in the art will understand the operation of the invention. Having reference to FIG. 1, the steam ejector plant draws an appropriate vacuum on diffuser 34 of the engine test facility in order to test the engine under the desired simulated conditions as referred to in the foregoing. The steam for the ejector plant is provided by the steam-generating system as shown in FIG. 2. The cycle of operation is as follows. The storage accumulators are filled to capacity by operating the circulating pump 210 and pump 235 with valves in position to effectuate this purpose. Then the oil heater is started as well as the oil-circulating pump 173 so that both this pump and the pump 210 are in operation. The hot oil is circulated at a temperature of 600° F., for example, and a pressure slightly above atmospheric on the shell out of the exchanger. Heating of the circulating water continues with gradually increasing pressure to a maximum of, for example, 600 lbs. per square inch in one or more of the storage accumulators. At the increasing temperature the system becomes pressurized. Preferably, the system is provided with standard industrial controls, not shown, and automatically shuts down when the water is heated to the preset pressure and temperature. Controls may be provided also to shut down in the event of high oil temperature. To operate the steam ejector plant the control valve 110 is opened to flash into steam some of the water from the storage accumulators. The water may be flashed into steam at 100 lbs. per square inch, for example, when starting a run with the tanks at 400 lbs. per square inch, for example.

During a cycle of operation about one-seventh of the tank contents by weight, for example, may be converted to steam. Thus, the tank contents are at a minimum of six-sevenths of the volume before a run. After a steam run the makeup feed water pump 235 is turned on by an operator to pump makeup water into the storage accumulators. The makeup feed water pump is similar to a boiler feed water pump.

As a practical matter in operation, the storage accumulators are never more than 87 percent full so as to provide sufficient evolution surface at the top. The steam forms in the top of the accumulators and is released at the water surfaces therein. Water is not entrained in steam forming in the pipes leading to the reducing valves so that water hammer damage at the control valve is avoided. Preferably, the accumulators are provided with visual sight gauges so that when an operator observes that a tank is full, the feed pump may be shut off. The controls may be entirely manual or various preferred arrangements of automatic industrial controls may be provided as referred to in the foregoing.

From the foregoing, those skilled in the art will appreciate that the invention achieves and realizes all of the objects and advantages as set forth in detail in the foregoing, as well as having many additional advantages that are apparent from the detailed description.

The foregoing disclosure is representative of a preferred form of the invention and is to be interpreted in an illustrative rather than in a limiting sense, the invention to be accorded the full scope of the claims appended hereto.

What is claimed is:

1. A steam-generating system adapted for use with process systems utilizing steam-driven ejectors comprising a water storage accumulator, heat exchanger means, means for heating water in the heat exchanger and circulating it to the water storage accumulator and for increasing the pressure in the accumulator during the heating cycle, the said heat exchanger means being the sole component in the system for heating the water, the accumulator being substantially full of water during the heating cycle and means connected to the water accumulator for flashing steam therefrom at a reduced pressure relative to the pressure in the accumulator.

2. A system as in claim 1 including a plurality of said water storage accumulators connected in parallel for inflow and outflow.

3. A system as in claim 1 wherein the said heat exchanger means comprises means for circulating heating fluid through it at ambient pressure.

4. A system as in claim 3 including heating means for heating said heating fluid, said heating means being fired by a combustible fluid.

5. A system as in claim 1 including water supply means for pumping makeup water into the system prior to the beginning of a heating cycle.

6. A method of generating steam adapted for operating a steam ejector plant comprising the steps of filling a water storage accumulator with water, circulating water from the storage accumulator through a heat exchanger for heating the water and back to the storage accumulator, utilizing the said heat exchanger solely for heating the said water, heating the water in the heat exchanger under gradually increasing pressure to a given maximum of pressure while maintaining the storage accumulator substantially full of water and flashing a portion of the water to steam from the accumulator at a lower pressure through a control valve.

7. A method as in claim 6 wherein the pressure of the water is increased to a relatively high pressure and is flashed into steam at a substantially lower pressure.

8. A method as in claim 6 including the step of circulating heating fluid at ambient pressure through the heat exchanger.

9. A method as in claim 6 including the step of heating oil and circulating it through the heat exchanger for heating the water.

* * * * *